United States Patent
El-Kersh

(10) Patent No.: US 9,052,923 B2
(45) Date of Patent: *Jun. 9, 2015

(54) OBJECT REPLACEMENT METHOD, SYSTEM AND COMPUTER PROGRAM PRODUCT

(75) Inventor: Ehab El-Kersh, Alexaandria (EG)

(73) Assignee: International Business Machines Corporation, Armonk, NY (US)

( * ) Notice: Subject to any disclaimer, the term of this patent is extended or adjusted under 35 U.S.C. 154(b) by 55 days.

This patent is subject to a terminal disclaimer.

(21) Appl. No.: 13/487,652

(22) Filed: Jun. 4, 2012

(65) Prior Publication Data

US 2012/0240102 A1    Sep. 20, 2012

Related U.S. Application Data

(63) Continuation of application No. 12/093,414, filed as application No. PCT/EP2006/067694 on Oct. 24, 2006, now Pat. No. 8,276,119.

(30) Foreign Application Priority Data

Nov. 18, 2005  (EP) ..................................... 05110945

(51) Int. Cl.
   *G06F 9/44*    (2006.01)
(52) U.S. Cl.
   CPC .................................... *G06F 9/4428* (2013.01)
(58) Field of Classification Search
   None
   See application file for complete search history.

(56) References Cited

U.S. PATENT DOCUMENTS

| 5,564,119 | A | 10/1996 | Krawchuk et al. |
| 5,652,884 | A | 7/1997 | Palevich |
| 6,035,342 | A * | 3/2000 | Bernstein et al. ............. 719/315 |
| 6,292,804 | B1 | 9/2001 | Ardoin et al. |
| 6,335,741 | B1 | 1/2002 | Nock |
| 6,633,869 | B1 * | 10/2003 | Duparcmeur et al. ................. 1/1 |
| 7,245,320 | B2 | 7/2007 | Kaplinsky et al. |
| 7,734,457 | B2 * | 6/2010 | Deffler ............................. 703/13 |
| 7,788,238 | B2 * | 8/2010 | Gabriel et al. ................. 707/695 |
| 8,276,119 | B2 | 9/2012 | El-Kersh |

(Continued)

OTHER PUBLICATIONS

Joseph et al., Object-Oriented Databases: Design and Implementation, Proceedings of the IEEE, 79(1):42-64, Jan. 1991.

(Continued)

*Primary Examiner* — Don Wong
*Assistant Examiner* — Daxin Wu
(74) *Attorney, Agent, or Firm* — Yee & Associates, P.C.; Parashos Kalaitzis

(57) ABSTRACT

Replacing an object in an object oriented model in a computer system, by interrogating the model to retrieve information defining the relationships between the object to be replaced and other components of the model is described. These relationship definitions are then used to configure the replacement object within the model so as to assume corresponding relationships with the other components. There may be established as a part of the model functions to detect changes to the relationships between objects belonging to the model, and recording the changes in a registry. This registry is then interrogated to retrieve relationship definitions necessary to replace an object.

17 Claims, 4 Drawing Sheets

(56) References Cited

U.S. PATENT DOCUMENTS

| | | | |
|---|---|---|---|
| 2003/0163479 | A1 | 8/2003 | Mathews et al. |
| 2003/0204517 | A1 | 10/2003 | Skinner et al. |
| 2004/0015480 | A1* | 1/2004 | Federighi et al. ............. 707/1 |
| 2004/0015829 | A1* | 1/2004 | Mullins et al. ............. 717/104 |
| 2004/0243605 | A1* | 12/2004 | Bernstein et al. ........... 707/100 |
| 2005/0050537 | A1* | 3/2005 | Thompson et al. .......... 717/165 |
| 2005/0223010 | A1 | 10/2005 | Murray |
| 2006/0150169 | A1* | 7/2006 | Cook et al. ................. 717/156 |
| 2006/0206866 | A1 | 9/2006 | Eldrige et al. |
| 2008/0301658 | A1 | 12/2008 | El-Kersh |

OTHER PUBLICATIONS

Office Action regarding U.S. Appl. No. 12/093,414, dated Jul. 11, 2011, 11 pages.
Response to Office Action regarding U.S. Appl. No. 12/093,414, dated Nov. 9, 2011, 11 pages.
Final Office Action regarding U.S. Appl. No. 12/093,414, dated Feb. 2, 2012, 8 pages.
Response to Final Office Action regarding U.S. Appl. No. 12/093,414, dated May 1, 2012, 7 pages.
Notice of Allowance regarding U.S. Appl. No. 12/093,414, dated May 21, 2012, 10 pages.

* cited by examiner

OBJECT REPLACEMENT METHOD, SYSTEM AND COMPUTER PROGRAM PRODUCT

This application is a continuation of application Ser. No. 12/093,414 filed May 12, 2008, now issued as U.S. Pat. No. 8,276,119, which is the National Phase of PCT/EP2006/067694 filed Oct. 24, 2006 which also claims priority from European Patent Application No. 05110945.2 filed Nov. 18, 2005, all of which are incorporated herein by reference.

FIELD OF THE INVENTION

The present invention relates to the replacement of objects in an object oriented environment.

BACKGROUND

A programming approach based on the concepts of data abstraction and inheritance is known. Unlike procedural programming techniques, object-oriented programming concentrates on what data objects comprise the problem and how they are manipulated, not on how something is accomplished. The approach is in particular applied, for example, in the fields of application coding using languages such as Java (Registered Trade Mark "RTM") or C++ or database structures.

Such data objects are collections of data and member functions that operate on that data, which together represent a logical entity in the system. In object-oriented programming, objects are grouped into classes that share common data definitions and member functions. Each object in the class is said to be an instance of the class. Object oriented approaches have been adapted to use in the modeling of complex systems. In visual composition, an instance of an object class consists of attributes, a data structure, and operational member functions. It can represent a person, place, thing, event, or concept. Each instance has the same properties, at tributes, and member functions as other instances of the object class, though it has unique values assigned to its attributes. Systems modeled using such approaches include software projects themselves, and even the functions of businesses. Specialized languages for describing and handling such Eclipse® have been devised, in addition to extensions of conventional object oriented programming languages.

Inside any Object Oriented system objects are interconnected by references to one another. For any given object there may be other objects that are referencing it and others that are referenced by it. If a user creates a new object and wants to replace the original one with the newly created one, the problem is that it is then necessary to rebuild all the connections once again for the new object. The same problem appears in transformation engines or any such case that needs replacing objects.

Thus a user wishing to update an object is presented with the tasks of inserting the new object, moving the old object connections to the new object in order to re-establish valid links between objects so as to correctly realign them, based on personal memory, then deleting the old object. This is of course a major undertaking with an obvious cost in terms of operator time. There is also the danger of user error introducing faults and inconsistencies.

SUMMARY

According to embodiments of the present invention there is provided method of amending an object oriented model comprising identifying a first object or set of objects to be added to the model, identifying a second object or group of objects to be replaced by the first object or group of objects; interrogating the model to retrieve information defining relationships between the second object or group of objects and other components of the model; and using the relationship definitions to configure the first object or group of objects within the model so as to assume corresponding relationships with the other components.

According to other embodiments of the present invention there is provided systems for amending an object oriented model comprising means for identifying a first object or set of objects to be added to the model, means for identifying a second object or group of objects to be replaced by the first object or group of objects; means for interrogating the model to retrieve information defining relationships between the second object or group of objects and other components of the model; and means for using the relationship definitions to configure the first object or group of objects within the model so as to assume corresponding relationships with the other components.

According to yet other embodiments of the present invention there is provided computer program products comprising computer readable medium containing computer instructions for amending an object oriented model, the computer instructions which when loaded on a computer system cause the computer system to identify a first object or set of objects to be added to the model, identify a second object or group of objects to be replaced by the first object or group of objects, interrogate the model to retrieve information defining relationships between the second object or group of objects and other components of the model; and uses the relationship definitions to configure the first object or group of objects within the model so as to assume corresponding relationships with the other components.

Further advantages of the present invention will become clear to the skilled person in the art upon examination of the drawings and detailed description.

BRIEF DESCRIPTION OF THE DRAWINGS

Embodiments of the present invention will now be described by way of example with reference to the accompanying drawings in which like references denote similar elements, and in which.

DETAILED DESCRIPTION

Figure 1:
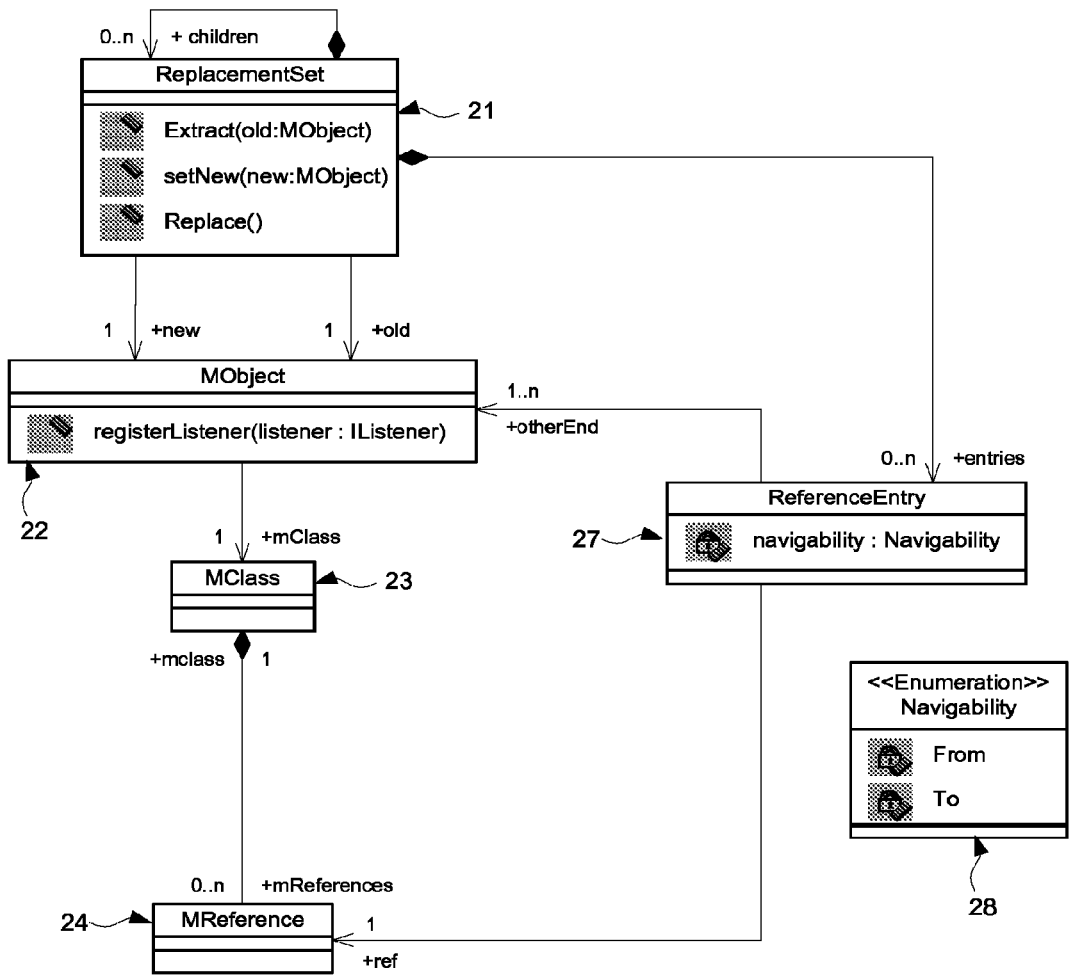
FIG. 1 shows a representation of an exemplary object oriented environment in which the invention may be implemented.

FIG. 1 shows a formal representation of an exemplary object oriented environment in which the invention may be implemented. The representation is based on UML diagram conventions.

All objects in the system inherit "MObject" 22. MObject 22 supports registering listeners on it and notifying these listeners upon changes. MObject 22 has a meta-class "MClass" 23 which carries meta-information about MObject's references MReference 24.

According to a first embodiment, when an object is to be replaced, a model interrogation is performed in order to determine all links between the object to be replaced, and other objects. The system is configured to traverse the model to extract connection information and apply the extracted information to a new object. Each system may traverse its model differently, which may lead to inconsistent extracting and applying connections across different systems. One method may traverse the whole model, which represents a substantial drain on system resources. Another method may traverse only a part of the model to improve performance thereby compromising completeness. During searching for connections between model objects and an old object, one method can apply the found connection to a new object immediately after it is found and then resume the search. Another method may finish the search first then apply all found connections to the new object.

Assuming that all system objects are in the List "allObjs", interrogating them to find the objects that refer to the old object can be performed as exemplified in the following pseudo code:

```
List foundRefsEntries;
for (int i =0; i < allObjs.length; i++) {
        //for each object in the list
    MObject obj = allObjs.get(i);
    List refs = obj.getAllMReferences( );
    for (int j = 0; j < refs.length; j++){
            //for each reference in that object
        MReference ref = refs.get(j);
        if(obj.get(ref) = =old) {
            //that object's reference refers to
            the old object
            ReferenceEntry refEntry = new ReferenceEntry( );
            //creating ReferenceEntry, filling
            it then adding it to the found list
            refEntry.setOtherEnd(obj);
            refEntry.setRef(ref);
            refEntry.setNavigability(Navigability.From);
            foundRefsEntries.add(refEntry);
            }
        }
    }
ReplacementSet rs= new ReplacementSet ( );
            //creating ReplacementSet and
            filling it
rs.setEntries(foundRefsEntries);
rs.setOld(old);
```

The information thus gathered can then be used in defining new, replacement, objects so as to assume the correct connections.

Thus a method according to this embodiment comprises the steps of identifying a first object or set of objects to be added to the model (FIG. 4, element 430), identifying a second object or group of objects to be replaced by the first object or group of objects (FIG. 4, element 440); interrogating the model to retrieve information defining the relationships between the first object or group objects; interrogating the model to retrieve information defining the relationships between the first object or group of objects and other components of the model; and using the relationship definitions to configure the first object or group of objects within the model so as to assume corresponding relationships with the other components.

The information retrieved is preferably meta-information. Certain kinds of meta-information are mentioned in the embodiment above. Meta-information is meta-data which means all meta-class information that includes information about an object's references, attributes, super classes, etc. This information generally describes the object's structure rather than the values of its references and attributes. Using this meta-data, the values of its references and attributes can be retrieved in a generic way.

Figure 2:
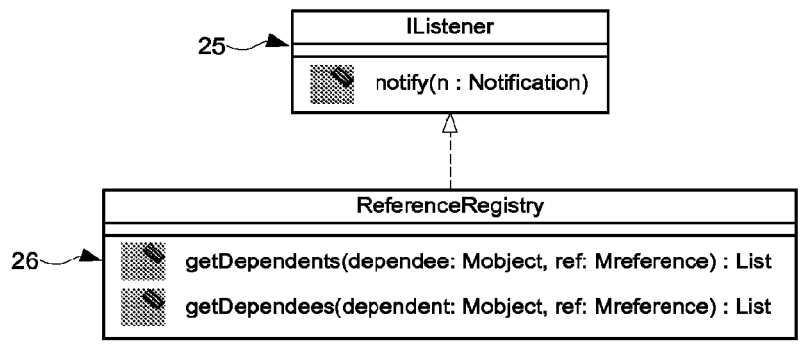
FIG. 2 shows a representation of a development of the arrangement of FIG. 1 according to a second embodiment.

FIG. 2 shows a sample formal representation of a development of the arrangement of FIG. 1 according to a second embodiment.

Figure 4:
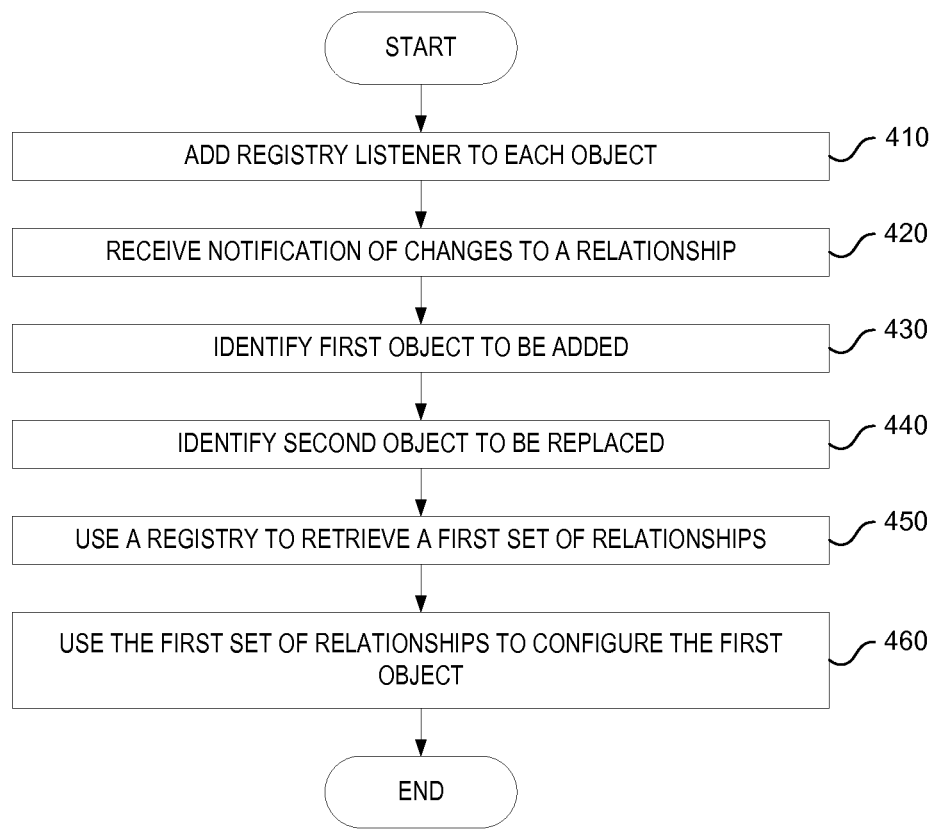

All objects in the system inherit "MObject" 22. MObject 22 supports registering listeners 25 on it and notifying these listeners 25 upon changes (FIG. 4, element 410). MObject 22 has a meta-class "MClass" 23 which carries meta-information about MObject's references MReference 24.

The "ReferenceRegistry" 26 registers itself as listener on all model objects 22. When the "MObject" 22 changes, it notifies the registry 26 (FIG. 4, element 420). When the notification is about reference change, the registry 26 updates its records accordingly. The record contains the referencing object (the dependent), the referenced object (the dependee) and the meta-reference.

When the user selects an object to replace another one, the system calls the "extract" method in the "ReplacementSet" 21 giving it to the old object. For the references from the old object "To" other objects, the method queries the "ReferenceRegistry" 26 with the old object to get the dependee objects and the "MReference"(s) 24 that the old object refers to them with (FIG. 4, element 450). For each reference 24, it creates a "ReferenceEntry" 27 object with "navigability="To" to hold the "MReference" 24 and its value (the "otherEnd").

Figure 5:
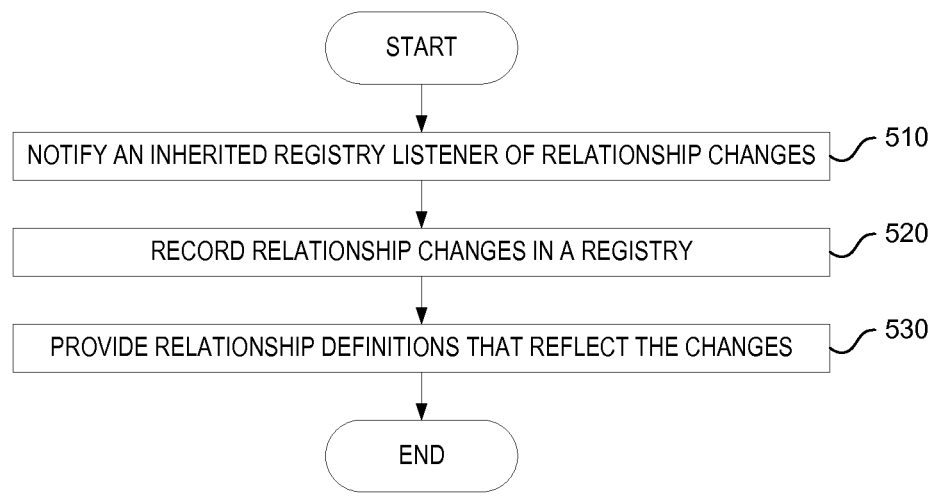

For the references to the old object "From" other objects, the method queries the "ReferenceRegistry" 26 with the old object to get the dependent objects and the "MReference"(s) 24 that they refer to the old object with (FIG. 5, element 530). For each reference, it creates "ReferenceEntry" 27 object with "navigability="From" to hold the "MReference" 24 and its objects (the "otherEnd").

The "ReplacementSet" 21 can have child sets for the old object child objects. When new objects are set for parent and child replacement sets using the "setNew" method and the system calls the parent "replace" method, it calls the child sets' "replace" recursively (FIG. 4, element 460).

This method gets the "ReferenceEntry"(s) 27 where "navigability="To" and starts to update the new object references with the "otherEnd" values. For the "navigability="From", the method updates the "otherEnd" objects' references with the new object.

Thus according to this embodiment there are provided the further steps of detecting changes to the relationships between objects belonging to the model (FIG. 5, element 510), and recording the changes in a registry, and at the step of interrogating it is the registry which provides the relationship definitions (FIG. 5, element 520).

Program code is preferably provided according to an object oriented programming language and may include for example objects defining the entities which constitute a business, and by their interrelations define the processes established within that business. An example of such an object may be an object defining a five-point quality control check. Each object is defined by meta-information including information about the object's references, attributes, super classes etc. As an object's references change over time this is reflected in the meta-information. In the case of the quality control check, the meta-information identifies the processing feeding into this process, and the path to be followed in a case where the quality control was either passed or failed. In a case where a new, six-point quality control check is introduced in place of the five point process, according to an embodiment of the present invention the new six-point quality control check can simply be inserted in place of the old five-point quality control check, and its position in the overall process established with reference to the five-point quality control check's meta information.

Figure 3A:
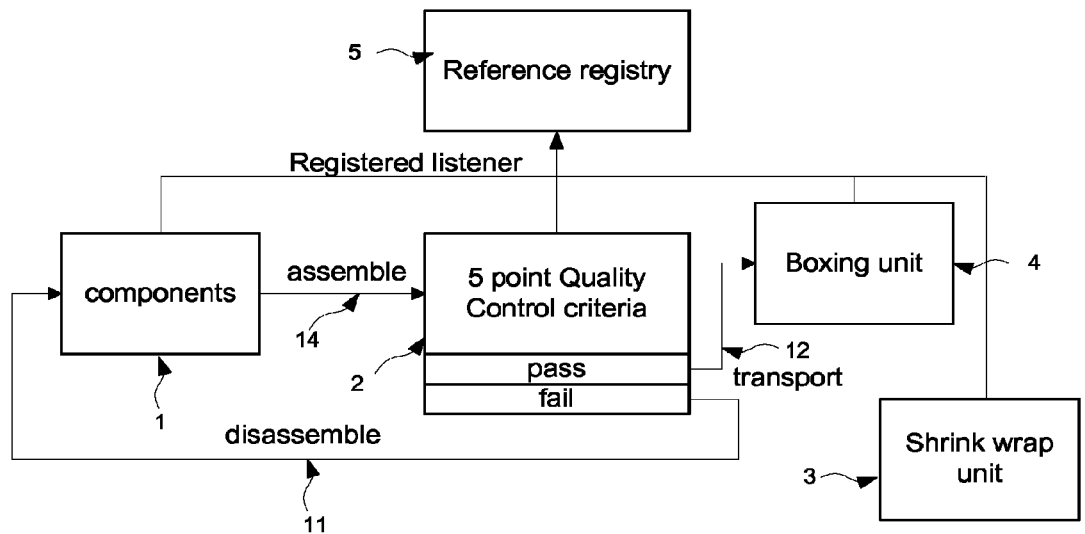
FIGS. 3a, 3b, 3c, 4 and 5 show sample embodiments of the present invention using the environments and arrangements described in FIGS. 1 and 2.

FIG. 3a shows a sample embodiment of the present invention. This embodiment describes a practical application of the invention, which may be realized by means of the structure described with reference to FIGS. 1 and 2. Objects are defined so as to support the registering of listeners and notifying these listeners upon changes. An object has a meta-class which carries meta-information about the object's references. A Reference Registry 5 registers itself as listener on all objects. When an object changes, it notifies the registry. These functions may be implemented for example by means of the adapter or observer tools provided by the Eclipse® modeling framework, or using the reflection API of the Java® Virtual Machine. When the notification concerns reference change, the registry updates its records accordingly. The record contains the referencing object (the dependent), the referenced object (the dependee) and the meta-reference, that is, the reference of the reference.

As shown in FIG. 3a, there are provided the following objects representing elements in an industrial process: the "components" object 1 representing the components which are required for the manufacture of a particular article, the "5 point Quality Control criteria" 2 object which represents a particular quality control check which assembled articles must satisfy in order to be dispatched for sale, a "boxing unit" 4 and a "shrink wrap unit" 3 which both represent packaging means. The various objects are interconnected by references. A reference "assemble" 14 connects the object "components" 1 and the object "5 point quality control criteria" 2, a reference "transport" 12 connects the object "5 point quality control criteria" 2 with the object "boxing unit" 4 in a case where the quality control criteria are met, and a reference "disassemble" 11 connects the object "5 point quality control criteria" 2 with the object "components" 1 in a case where the quality control criteria are not met. No references exist to the "shrink wrap unit" object 3. The Reference Registry 5 is registered with all of the objects, so that any changes to the model's configuration are registered. Accordingly, in the situation shown in FIG. 3a the contents of the Reference Registry will be as follows:

| Referencing object | Referenced object | Meta reference |
| --- | --- | --- |
| Components | 5 point quality control criteria | Assemble |
| 5 point quality control criteria | Boxing unit | Transport |
| 5 point quality control criteria | Components | Disassemble |

Figure 3B:
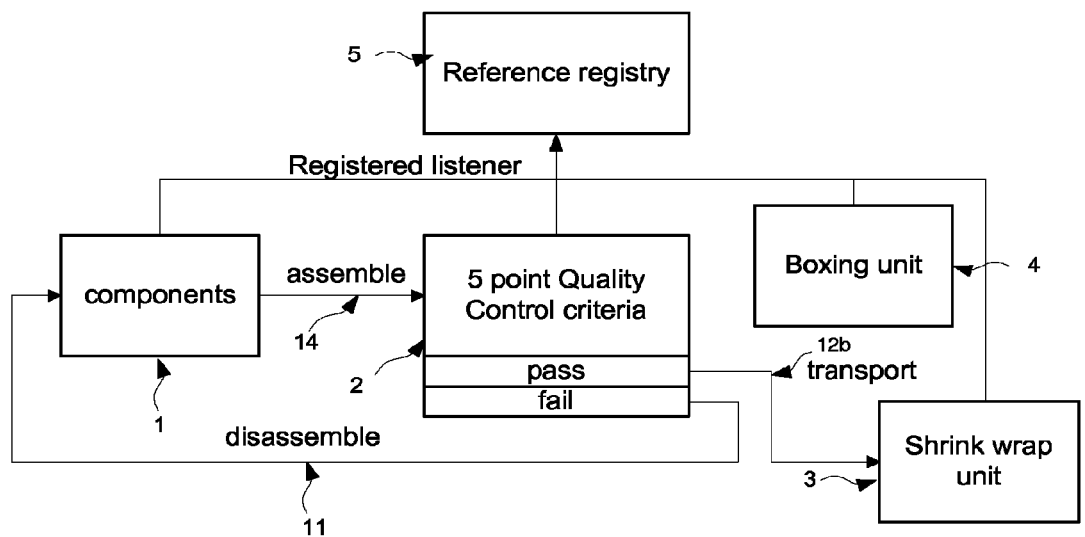

In FIG. 3b the model is amended from the example in FIG. 3a so that articles satisfying the 5 point quality control criteria 2 are transported to the shrink wrap unit 3 instead of the Boxing unit 4. Thus, in FIG. 3b the "Transport" reference 12b references the "shrink wrap unit" object 3. When this change is implemented, the "5 point quality control criteria" 2, "Boxing unit" 4 and "shrink wrap unit" 3 objects will notify the Reference registry 5 of the changes. The reference registry 5 will accordingly be amended as follows:

| Referencing object | Referenced object | Meta reference |
| --- | --- | --- |
| Components | 5 point quality control criteria | Assemble |
| 5 point quality control criteria | Shrink Wrap unit | Transport |
| 5 point quality control criteria | Components | Disassemble |

Figure 3C:
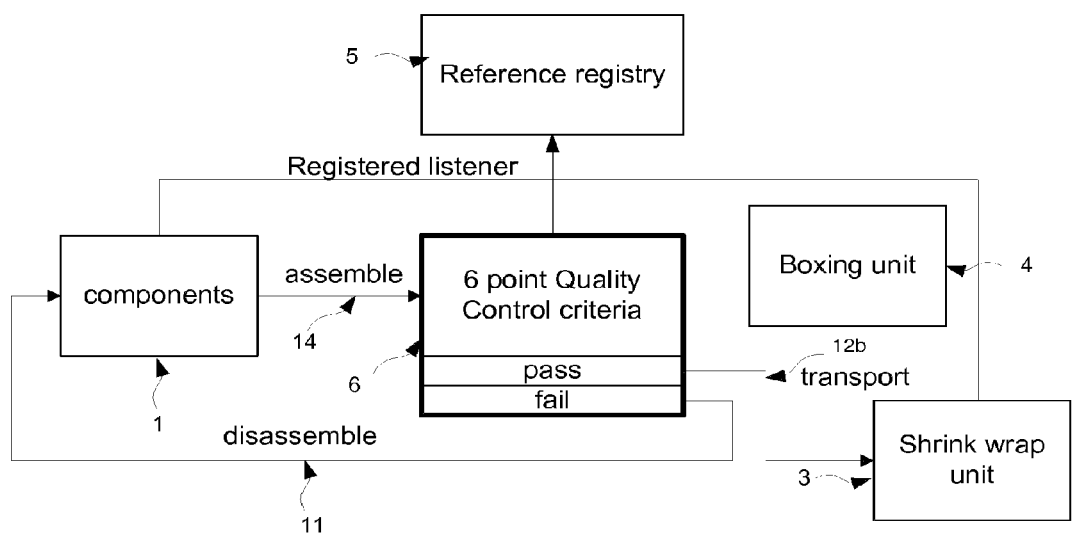

Suppose now for example that it was required to replace the "5 point quality control criteria" object 5 with a new, improved "6 point quality control criteria" object 6 as shown in FIG. 3c. By referring to the Reference registry the new object can be configured to slot into the position of the old "5 point quality control criteria" object 5 of FIG. 3b, in particular by assigning references in the system so that the new object will have relations with the processing feeding into this process, and the path to be followed in a case where the quality control was either passed or failed.

The steps of detecting changes to the relationships between objects belonging to the model, and recording changes in a registry may be realized for example by means of object cross references, reflection or meta information.

Preferably, objects referenced by an object to be replaced, the information retrieved with respect objects referenced by an object to be replaced is information, e.g. meta-information of the first object to be replaced, and with respect to objects which reference the object to be replaced the information is information stored in said registry.

According to a further embodiment there is defined a method of programmatically replacing an object in an object oriented model, by interrogating the model to retrieve information defining the relationships between the object to be replaced and other components of the model. These relationship definitions are then used to configure the replacement object within the model so as to assume corresponding relationships with the other components. There may be established as a part of the model functions to detect changes to the relationships between objects belonging to the model, and recording the changes in a registry. This Registry is then interrogated to retrieve relationship definitions necessary to replace an object.

Embodiments may be offered as a service for example in the form of a model maintenance method comprising the steps of detecting changes to the relationships between objects belonging to a model; recording said changes in a registry; and providing relationship definitions concerning one or more of said objects upon interrogation.

Although the terminology adopted above may be associated with particular software environments, modeling tools, or commercial or programming paradigms, the skilled person in the art will appreciate that the concepts presented herein will extend freely to object oriented environments generally.

Any element may be realized in terms of hardware, firmware, software or a combination of any or all of these. Where software components are provided, they may be placed temporarily or permanently on a carrier, such as an optical disc such as a CD or DVD, a magnetic disc such as a hard drive or floppy disc, a memory device such as a flash memory card, EPROM, volatile memory unit etc., or an optical, electrical, radio or other transmission channel, for example for the purposes of distribution.

The invention claimed is:

1. A computer implemented method of amending an object oriented model comprising the steps of:
adding a registry listener to each object of the group of objects in the object oriented model, wherein each respective object inherits support for adding the registry listener and for notifying the registry listener about changes to relationships between the respective object and other objects of the group of objects;

responsive to the registry listener receiving a notification of changes to a relationship between the object and other objects in a group of objects, updating a registry to reflect changes to the relationship between the object and the other object group objects, wherein the registry comprises a referencing object and a referenced object for the object, and wherein updating the registry comprises steps of:

identifying a first object to be added to the group of objects in the object oriented model;

identifying a second object of the group of objects to be replaced by the first object;

the computer using the registry to retrieve a first set of one or more relationships between the second object and other object of the group of objects; and the computer using the first set of one or more relationships to configure the first object of the group of objects in the object oriented model so as to assume a second set of one or more relationships corresponding to the first set of one or more relationships with the other objects of the group of objects.

2. The method of claim 1, further comprising:

wherein each object of the group of objects in the object oriented model also inherits support for relationship information about each object references, attributes, and superclasses; and wherein the first set of one or more relationships retrieved between the second object and other objects of the group of objects is relationship information about the second object references, attributes, and superclasses.

3. The method of claim 1, comprising the further steps of:

the computer detecting changes to relationships between the respective object and other objects of the group of objects; and the computer notifying the registry listener about the detected changes.

4. The method of claim 3, wherein said steps of the computer detecting changes to relationships between the respective object and other objects of the group of objects are realized by means of object cross references, reflection or meta information.

5. A method, executed by a hardware processor, comprising the steps of:

notifying an inherited registry listener of changes to relationships between objects belonging to a model;

recording said changes received by the inherited registry listener in a registry by updating the registry to reflect the changes to the relationships between the objects, wherein the registry comprises a referencing object and a referenced object for the objects; and providing relationship definitions concerning one or more of said objects upon interrogation, of the registry, wherein the provided relationship definitions reflect the changes.

6. A system for amending an object oriented model comprising:

a computer processor for executing instructions;

a memory coupled to the computer processor for storing said instructions that are operable, when executed by the computer processor, to perform steps of:

adding a registry listener to each object of the group of objects in the object oriented model, wherein each respective object inherits support for adding the registry listener and for notifying the registry listener about changes to relationships between the respective object and other objects of the group of objects;

updating a registry to reflect changes to the relationship between the object and the other object group objects in response to the registry listener receiving a notification of changes to a relationship between the object and other objects in a group of objects, wherein the registry comprises a referencing object and a referenced object for the object, and wherein updating the registry comprises steps of:

identifying a first object to be added to the group of objects in the object oriented model;

identifying a second object of the group of objects to be replaced by the first object;

using the registry to retrieve a first set of one or more relationships between the second object and other object of the group of objects; and using the first set of one or more relationships to configure the first object of the group of objects in the object oriented model so as to assume a second set of one or more relationships corresponding to the first set of one or more relationships with the other objects of the group of objects.

7. The system of claim 6 further comprising:

wherein each object of the group of objects in the object oriented model also inherits support for relationship information about each object references, attributes, and superclasses; and wherein the first set of one or more relationships retrieved between the second object and other objects of the group of objects is relationship information about the second object references, attributes, and superclasses.

8. The system of claim 6 further comprising:

detecting changes to relationships between the respective object and other objects of the group of objects; and notifying the registry listener about the detected changes.

9. The system of claim 8 wherein said detecting changes to relationships between the respective object and other objects of the group of objects are realized by means of object cross references, reflection or meta information.

10. A computer program product comprising a non-transitory computer readable medium having computer instructions, said instructions which when loaded on a computer system implement a method of amending an object oriented model, said method comprising the steps of:

adding a registry listener to each object of the group of objects in the object oriented model, wherein each respective object inherits support for adding the registry listener and for notifying the registry listener about changes to relationships between the respective object and other objects of the group of objects;

responsive to the registry listener receiving a notification of changes to a relationship between the object and other objects in a group of objects, updating the registry to reflect changes to the relationship between the object and the other object group objects, wherein the registry comprises a referencing object and a referenced object for the object, and wherein updating the registry comprises steps of:

identifying a first object to be added to the group of objects in the object oriented model;

identifying a second object of the group of objects to be replaced by the first object;

using the registry to retrieve a first set of one or more relationships between the second object and other object of the group of objects; and using the first set of one or more relationships to configure the first object of the group of objects in the object oriented model so as to assume a second set of one or more relationships corresponding to the first set of one or more relationships with the other objects of the group of objects.

11. The computer program product of claim 10 the method further comprising:
wherein each object of the group of objects in the object oriented model also inherits support for relationship information about each object references, attributes, and superclasses; and
wherein the first set of one or more relationships retrieved between the second object and other objects of the group of objects is relationship information about the second object references, attributes, and superclasses.

12. The computer program product of claim 10, wherein said method comprises the further steps of detecting changes to the relationship relationships between objects belonging to said model, the respective object and other objects of the group of objects; and
notifying the registry listener about the detected changes recording said changes in a registry, and wherein at said step of interrogating the model, it is said registry which provides said relationship definitions.

13. The computer program product of claim 12 wherein said steps of detecting changes to relationships between the respective object and other objects of the group of objects are realized by means of object cross references, reflection or meta information.

14. The method of claim 1, wherein the step of using the registry comprises:
querying the registry using the second object to get dependent objects that depend upon the second object and dependee objects that the second object refers to.

15. The method of claim 14, wherein the registry further comprises an object reference that the second object uses when referring to a given one of the dependee objects.

16. The system of claim 6, wherein the step of using the registry comprises:
querying the registry using the second object to get dependent objects that depend upon the second object and dependee objects that the second object refers to.

17. The system of claim 16, wherein the registry further comprises an object reference that the second object uses when referring to a given one of the dependee objects.

* * * * *